March 31, 1936.  W. PAGE  2,036,074
MEANS FOR AUTOMATICALLY ADJUSTING BRAKE SHOES
Filed May 15, 1935
FIG. I.
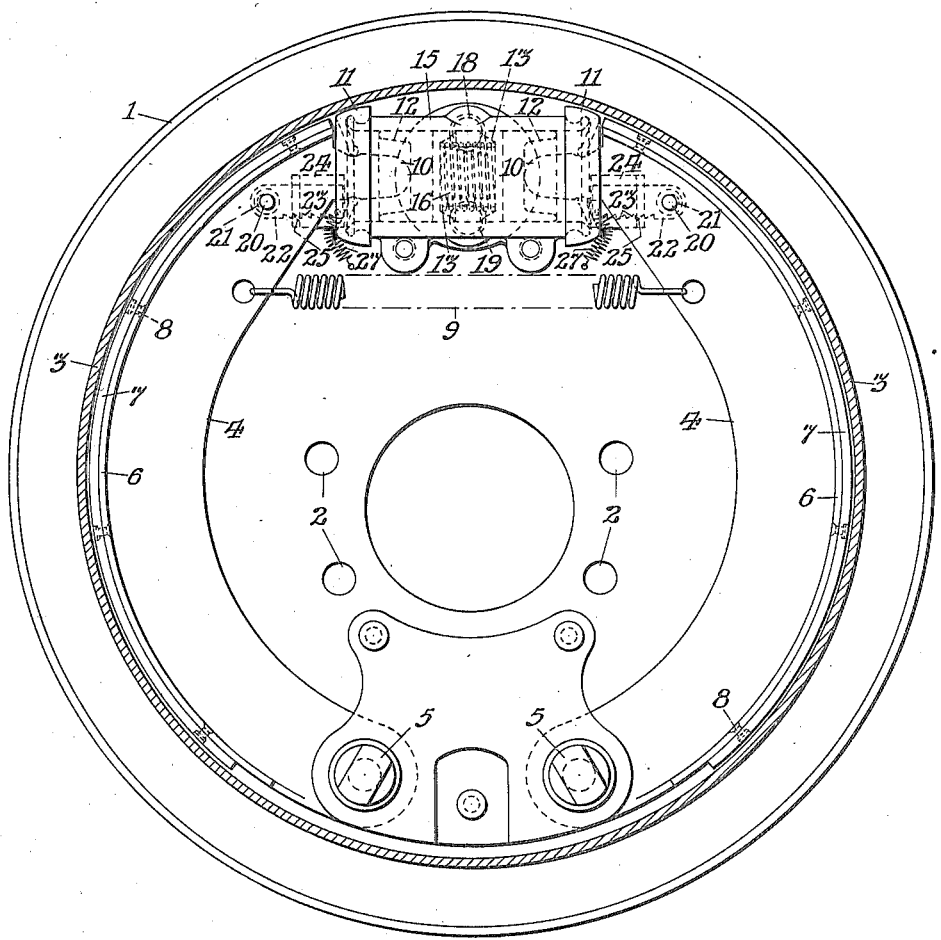
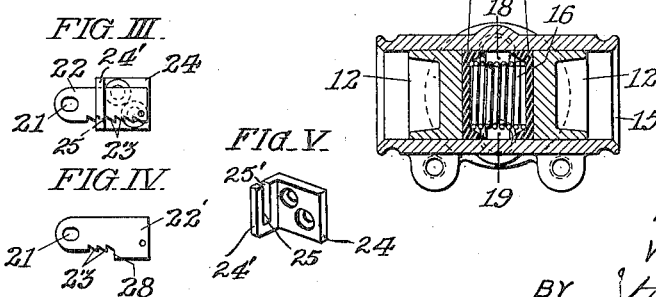
INVENTOR:
WILLIAM PAGE,
BY Patented Mar. 31, 1936

2,036,074

UNITED STATES PATENT OFFICE 2,036,074

MEANS FOR AUTOMATICALLY ADJUSTING BRAKE SHOES

William Page, Parkland, Pa.

Application May 15, 1935, Serial No. 21,520

11 Claims. (Cl. 188—79.5)

My invention is particularly applicable to expansible brakes for automobile wheels; wherein a pair of oppositely counterpart pivoted shoes, having arcuate outer surfaces provided with linings of friction fabric and supported by a stationary spider frame, are thrust apart and against the interior of a cylindrical brake drum flange on a wheel when it is desired to stop the rotation of the latter.

My invention may be employed with advantage in what is known as a hydraulic brake system; wherein the brakes are applied by liquid or other fluid pressure.

The principal purpose and effect of the invention is to automatically adjustably limit the motion of the shoes away from the surface of said brake drum flange when they are released from the pressure which thrusts them into such engagement; so that the minimum amount of clearance between the brake linings and said drum to permit such disengagement when the linings are new is substantially maintained as the linings are worn and in compensation for such wear, until further wear would expose the metal surface of the shoes for contact with the braking surface of the drum. Means may also be provided which, when the latter condition is attained, stop the further automatic adjustment of the shoes and thus prevent scoring of the drum surface therewith.

My invention includes the various novel features of construction and arrangement hereinafter more definitely specified.

In said drawing, Fig. I is an outside elevation of the spider frame which is fixed to the automobile chassis.

Fig. II is a vertical sectional view through the fluid cylinder by which pressure is applied to expand the brake shoes to braking position, which cylinder is fixed on the spider frame.

Fig. III is an elevation of the ratchet bar carried by the left hand shoe in Fig. I and the stationary ratchet plate with which it cooperates, which is fixed on the stationary spider frame.

Fig. IV is an elevation of a modified form of ratchet bar provided with said stop means.

Fig. V is a perspective view of the ratchet plate 24 shown in Fig. III.

In said figures, the substantially circular spider frame 1 is conveniently formed of pressed sheet metal having holes 2 for bolts by which it may be secured in rigid relation with the chassis of an automobile in concentric relation with the axis of the wheel, having the brake drum flange 3. Said frame supports oppositely counterpart brake shoes 4 which are pivotally supported on the bolts 5 which are normally stationary in said frame 1 but may be removed. Said shoes are conveniently formed of pressed sheet metal angle plates having outer flanges 6 which are arcuate and provided upon their outer surfaces with linings of friction fabric 7, conveniently connected therewith by rivets 8 and adapted to frictionally engage the inner surface of said brake drum flange 3 which is carried by the vehicle wheel which is to be stopped.

Said shoes 4 are connected by the spring 9 which continually tends to press the free ends thereof toward each other and away from braking engagement with said brake drum flange 3. The free ends 10 of said shoes 4 are fitted through respective cups 11 of soft rubber into engagement with the metal pistons 12 having cup leathers 13 and fitted to reciprocate in the cylinder 15 which is fixed on the spider frame. Said rubber cups merely serve to exclude dirt from access to said cylinder. Said pistons are normally thrust apart by the spring 16 interposed between them merely for the purpose of maintaining them in cooperative relation with said shoe ends 10. Said cylinder has ports 18 and 19 in the side thereof toward the spider frame for communication with a source of supply of fluid under pressure and through which such fluid may be introduced and withdrawn with respect to the space between said pistons. Ordinarily, a fluid brake system such as above contemplated includes a reservoir for fluid under pressure, in communication with such a cylinder at each wheel to be braked and a cylinder in the fluid pressure line provided with a plunger which may be operated by a foot or hand lever to augment the pressure in the system so as to apply the brakes. However, any suitable means may be employed for thrusting the brake shoes 4 apart, by fluid pressure or otherwise, as the essential part of my invention is the means for automatically adjusting said shoes to compensate for wear upon said linings 7.

I provide each of said shoes with a pivot stud 20 rigidly fixed therein and extending through a slot 21 in a ratchet bar 22 local to that shoe and having a series of ratchet teeth 23. Each bar is prevented from falling out of engagement with its stub by the head of the latter. Said bars 22 are respectively associated with ratchet plates 24, each having flanges at right angles, one of which is rigidly connected with said spider frame 1 and the other, 24', disposed in a vertical plane at right angles to the plane of the local ratchet bar, and having a vertical slot 25' receiving and within which said ratchet bar may move vertically and longitudinally; said slot having at the lower end thereof a single tooth 25 for selective engagement with said ratchet bar teeth 23. Each of said ratchet bars 22 is normally held down with one of its teeth 23 engaged with its ratchet plate by means of respective springs 27; each spring having its opposite ends respectively connected with its ratchet bar and said spider frame. The effect of said springs 27 is to move the respective ratchet bars 22 downwardly into engagement with the respective teeth 25 each time said bars are moved upwardly in their respective slots 24' to engage the successive teeth 23 of the bars with the respective single teeth 25 of the ratchet plates 24, automatically by the operation of the brake mechanism.

The arrangement above described is such that with the shoes 4 in the retracted position shown in Fig. I, to which they are stressed by said spring 9, said studs 20 are presented at the inner ends of said slots 21 so that the application of pressure to thrust the free ends 10 of said shoes 4 apart presses the friction linings 7 of said shoes outwardly into braking engagement with said wheel flange 3, without disturbing the position in which each of said ratchet bars is initially set; the clearance between said brake shoe linings 7 and said drum when the braking pressure is released being about twelve-thousandths of an inch, which would be practically invisible in the drawing which is made to a scale of nine-sixteenths of the full size. Therefore, the clearance space is exaggerated in said drawing.

However, when the linings 7 are made thinner by wear upon the brake drum flange 3, outward thrusting movement upon said shoes 4 causes the studs 20 to engage the outer ends of the slots 21 in the respective ratchet bars and shift the latter outwardly to engage the next tooth 23 on said bars with the respective ratchet plates 24 so that the minimum amount of clearance between the brake shoe linings and said drum to permit disengagement when the linings are new is substantially maintained as the linings are worn and in compensation for such wear.

To prevent scoring of the braking surface of the wheel flange 3 by the metal of the brake shoes 4 when the linings 7 are entirely worn off; I find it convenient to provide ratchet bars such as indicated at 22' in Fig. IV, each having a stop projection 28 adapted to encounter the inner surface of the local ratchet plate 24 to stop the outward movement of the brake shoes just short of scraping contact of the metal thereof with said braking flange 3. However, I do not desire to limit myself to the precise details of construction and arrangement herein set forth, as it is obvious that various modifications may be made therein without departing from the essential features of my invention, as defined in the appended claims.

I claim:

1. In automatically adjustable brake mechanism for a vehicle, the combination with a circular brake flange of a wheel to be braked; of a spider frame fixed on said vehicle in coaxial relation with said wheel brake flange; a ratchet plate fixed on said frame, and having a slot and a fixed ratchet tooth; a loose ratchet bar, having a stud slot near one end and having its other end fitted through said plate slot, and having a series of ratchet teeth along its lower edge for selective engagement with said plate tooth; a spring continually stressing said bar ratchet, whereby the latter is moved in said plate to cause its teeth to successively engage said plate tooth; a brake shoe pivoted at one end on said frame, having an arcuate flange for co-operation with said wheel, and having a stud near its other end extending through the slot in said ratchet bar for limiting the movement of said shoe toward and away from said wheel flange; spring means continually stressing said shoe away from said wheel flange; and means for moving said shoe toward said flange for braking operation; whereby said ratchet bar is normally held stationary on said spider frame, but is automatically adjustable toward said wheel flange by said shoe stud when said stud encounters the outer end of the slot in said bar before reaching braking relation with said flange.

2. Mechanism as in claim 1, wherein a lining of friction fabric is interposed between said wheel flange and said shoe, and said bar has a stop member for engaging said plate and preventing the movement of said shoe into scraping relation with said flange when said fabric is worn.

3. In an automatically operative brake mechanism, a brake shoe adjusting device, including a ratchet plate having flanges at right angles; one flange for supporting said plate in fixed position, the other flange having a slot therethrough with a single ratchet tooth at one edge of said slot; a loose ratchet bar having, near one end, a slot for engaging a projection from a brake shoe to limit the movement of the latter by the length of said slot; the other end of said bar being fitted through said plate slot, and having a series of ratchet teeth along one edge for selective engagement with said plate tooth; and spring means continually stressing said bar ratchet into engagement with said plate tooth.

4. A device as in claim 3, wherein the ratchet bar has a stop member for engaging said plate and preventing such adjustment of said bar as would permit the shoe to scrape and score the braking surface.

5. A device as in claim 3, wherein the plate and bar are formed of stampings of primarily flat sheet metal, and the spring means is formed of wire.

6. A device as in claim 3, wherein the plate and bar are formed of sheet metal stampings, and the spring means is formed of wire and pivotally connected at one end to said bar and at the other end to the plate support.

7. In a brake mechanism for vehicles, the combination with a brake shoe and a support which is stationary on the vehicle; of a brake shoe adjusting device including a ratchet plate carried by said support and having a vertically disposed slot presenting a single tooth at the lower end thereof, and a flat ratchet bar having one end pivotally connected to said brake shoe and extending through said slot, the lower side of said bar having a series of ratchet teeth for selective engagement with the tooth of said plate, and said bar being vertically movable in said slot about its pivotal support.

8. In a brake mechanism for vehicles, the combination with a brake shoe and a support which is stationary on the vehicle; of a brake shoe adjusting device including a pair of members, one connected to said support and the other connected to said brake shoe, one of said members comprising a ratchet bar pivoted at one end to swing in a vertical plane and having a series of ratchet teeth along the under side thereof, and the other of said members comprising a plate disposed in a vertical plane at right angles to the plane of said ratchet bar and having a vertical slot receiving and within which said ratchet bar may move vertically and longitudinally, and having a single tooth at the lower end of said slot for engaging the teeth of said ratchet bar.

9. Mechanism as in claim 8, wherein each of the ratchet bars is provided with a spring for moving it transversely in its ratchet plate and effecting engagement of the successive ratchet bar teeth with the plate tooth by the automatic operation of the brake mechanism.

10. In a brake mechanism for vehicles, the combination with a brake shoe and a stationary support; of a brake shoe adjusting device including a pair of members, one connected to said support and the other connected to said brake shoe; one of said members comprising a ratchet bar pivoted at one end to swing in a vertical plane and having a series of ratchet teeth along the underside thereof; the other of said members comprising a plate disposed in a vertical plane parallel to the plane of said ratchet bar and having a rigid horizontal projection at right angles thereto and on which said ratchet bar rests, said projection presenting an upwardly facing rigid tooth for engaging the teeth of said ratchet bar.

11. In a brake mechanism for vehicles, the combination with a brake shoe and a stationary support; of a brake shoe adjusting device including a pair of members, one connected to said support and the other connected to said brake shoe; one of said members comprising a ratchet bar pivoted at one end to swing in a vertical plane and having a series of ratchet teeth along the underside thereof; the other of said members comprising a plate disposed in a vertical plane parallel to the plane of said ratchet bar and having a rigid horizontal projection at right angles thereto and on which said ratchet bar rests, said projection presenting an upwardly facing rigid tooth for engaging the teeth of said ratchet bar; and a spring for pulling said ratchet bar downwardly about its pivot and holding it in operative engagement with said rigid projection.

WILLIAM PAGE.